(12) United States Patent
Kolesar et al.

(10) Patent No.: US 7,275,928 B2
(45) Date of Patent: *Oct. 2, 2007

(54) APPARATUS FOR FORMING A STRIATION REDUCED CHEMICAL MECHANICAL POLISHING PAD

(75) Inventors: David M. Kolesar, Gulph Mills, PA (US); Robert L. Post, Ivyland, PA (US); Alan H. Saikin, Landenberg, PA (US); Aaron Sarafinas, Ivyland, PA (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 318 days.

This patent is subject to a terminal disclaimer.

(21) Appl. No.: 10/996,199

(22) Filed: Nov. 23, 2004

(65) Prior Publication Data

US 2006/0110488 A1 May 25, 2006

(51) Int. Cl.
*B29C 44/06* (2006.01)
*B01F 13/02* (2006.01)

(52) U.S. Cl. .................. 425/447; 366/137; 366/139

(58) Field of Classification Search ............... 425/145, 425/256, 447, 449; 428/147; 451/526, 28, 451/64; 366/136, 137, 139
See application file for complete search history.

(56) References Cited

U.S. PATENT DOCUMENTS

| | | | |
|---|---|---|---|
| 5,489,233 A | 2/1996 | Cook et al. | |
| 5,578,362 A | 11/1996 | Reinhardt et al. | |
| 6,022,268 A | 2/2000 | Roberts et al. | |
| 6,149,506 A | 11/2000 | Duescher | |
| 6,328,634 B1 | 12/2001 | Shen et al. | |
| 6,362,107 B1 | 3/2002 | Shiro et al. | |
| 6,454,634 B1 | 9/2002 | James et al. | |
| 6,514,301 B1 | 2/2003 | Lombardo | |
| 6,620,537 B2 | 9/2003 | Struthers et al. | |
| 6,627,671 B1 * | 9/2003 | Kihara et al. | 521/159 |
| 6,649,084 B2 * | 11/2003 | Morikawa et al. | 252/182.22 |
| 6,705,934 B1 | 3/2004 | Shiro et al. | |
| 6,984,163 B2 * | 1/2006 | Roberts | 451/6 |
| 2004/0242719 A1 * | 12/2004 | Seyanagi et al. | 521/155 |
| 2006/0067160 A1 * | 3/2006 | Koetas et al. | 366/102 |
| 2006/0226568 A1 * | 10/2006 | James et al. | 264/45.4 |
| 2006/0228439 A1 * | 10/2006 | James et al. | 425/542 |

* cited by examiner

*Primary Examiner*—Robert Davis
*Assistant Examiner*—Marissa W. Chaet
(74) *Attorney, Agent, or Firm*—Edwin Oh; Thomas S. Deibert (57) ABSTRACT

The present invention provides an apparatus for forming a chemical mechanical polishing pad, comprising a tank with polymeric materials, a storage silo with microspheres and a curative storage tank with curing agents. The apparatus further provides a premix prep tank for forming a premixture of the polymeric materials and the microspheres and a recirculation loop in the premix prep tank for recirculating the pre-mixture until a desired bulk density is reached. The apparatus further provides a premix run tank for storing the pre-mixture, a mixer for forming a mixture of the pre-mixture and the curing agents and a mold for molding the mixture.

10 Claims, 7 Drawing Sheets

APPARATUS FOR FORMING A STRIATION REDUCED CHEMICAL MECHANICAL POLISHING PAD

BACKGROUND OF THE INVENTION

The present invention relates to polishing pads for chemical mechanical planarization, and in particular, relates to polishing pads having reduced striations. Further, the present invention relates to apparatuses and methods for forming polishing pads having reduced striations.

In the fabrication of integrated circuits and other electronic devices, multiple layers of conducting, semiconducting and dielectric materials are deposited on or removed from a surface of a semiconductor wafer. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the wafer becomes non-planar. Because subsequent semiconductor processing (e.g., metallization) requires the wafer to have a flat surface, the wafer needs to be planarized. Planarization is useful in removing undesired surface topography and surface defects, such as rough surfaces, agglomerated materials, crystal lattice damage, scratches, and contaminated layers or materials.

Chemical mechanical planarization, or chemical mechanical polishing (CMP), is a common technique used to planarize substrates, such as semiconductor wafers. In conventional CMP, a wafer is mounted on a carrier assembly and positioned in contact with a polishing pad in a CMP apparatus. The carrier assembly provides a controllable pressure to the wafer, pressing it against the polishing pad. The pad is moved (e.g., rotated) relative to the wafer by an external driving force. Simultaneously therewith, a chemical composition ("slurry") or other polishing solution is provided between the wafer and the polishing pad. Thus, the wafer surface is polished and made planar by the chemical and mechanical action of the pad surface and slurry.

Reinhardt et al., U.S. Pat. No. 5,578,362, discloses an exemplary polishing pad known in the art. The polishing pad of Reinhardt comprises a polymeric matrix having microspheres dispersed throughout. Generally, the microspheres are blended and mixed with a liquid polymeric material, for example, in a mass flow feed delivery system, and transferred to a mold for curing. The molded article is then cut to form polishing pads. Unfortunately, polishing pads formed in this manner may have unwanted striations.

Striations are the result of variations in bulk density of the microspheres in the polymeric matrix. In other words, different areas of higher and lower concentrations of the microspheres are present in the polymeric matrix. For example, in the polishing pad of Reinhardt, the low true density of the microspheres inhibits the free or uninterrupted flow of the microspheres in the mass flow feed delivery system. Consequently, the microspheres tend to "cluster" together in varying degrees, at different points in the delivery process (i.e., causing variations in bulk density or striations). These striations are unwanted because they may cause unpredictable, and perhaps, detrimental, polishing performances from one polishing pad to the next. Moreover, these striations may negatively affect polishing performances within the pad itself.

Typically, these striations were reduced by utilizing combinations of gravity, various storage silo designs, mechanical forces (e.g., vibration), and manual, periodic-sampling, adjusting process conditions and re-measuring to determine bulk density. However, prior art apparatuses and methods are inadequate and inefficient at controlling bulk density to meet the ever increasing demands of the CMP industry.

Hence, what is needed is a polishing pad having reduced striations. Moreover, what is needed is an apparatus and an efficient method of forming a polishing pad having reduced striations.

STATEMENT OF THE INVENTION

In a first aspect of the present invention, there is provided an apparatus for forming a chemical mechanical polishing pad, comprising: a tank with polymeric materials; a storage silo with microspheres; a curative storage tank with curing agents; a premix prep tank for forming a pre-mixture of the polymeric materials and the microspheres; a recirculation loop in the premix prep tank for recirculating the pre-mixture until a desired bulk density is reached; a premix run tank for storing the pre-mixture; a mixer for forming a mixture of the pre-mixture and the curing agents; and a mold for molding the mixture.

In a second aspect of the present invention, there is provided an apparatus for forming a chemical mechanical polishing pad, comprising: a first prepolymer storage tank with first polymeric materials; a storage silo with microspheres; a curative storage tank with curing agents; a premix prep tank for forming a pre-mixture of the first polymeric materials and the microspheres; a recirculation loop in the premix prep tank for recirculating the pre-mixture until a desired bulk density is reached; a premix run tank for storing the pre-mixture; a mixer for forming a mixture of the pre-mixture and the curing agents; at least a second prepolymer storage tank with second polymeric materials for providing the second polymeric materials to the mixture until a desired bulk density is reached; and a mold for molding the mixture.

In a third aspect of the present invention, there is provided an apparatus for forming a chemical mechanical polishing pad, comprising: a prepolymer storage tank with polymeric materials; a storage silo with microspheres; a curative storage tank with curing agents; a premix run/prep tank for forming a pre-mixture of the polymeric materials and the microspheres; a recirculation loop in the premix run/prep tank for recirculating the pre-mixture until a desired bulk density is reached; a mixer for forming a mixture of the pre-mixture and the curing agents; and a mold for molding the mixture.

DETAILED DESCRIPTION OF THE INVENTION

The present invention provides a striation reduced polishing pad. Further, the present invention provides a novel casting apparatus and method for forming a striation reduced polishing pad. In particular, the present invention utilizes a unique premix apparatus to reduce the striations in the polishing pad. The premix apparatus comprises, a novel premix prep tank for pre-mixing the microspheres and the prepolymers to form a homogeneous pre-mixture. The premix apparatus further comprises a recirculation loop for recirculating the pre-mixture until a desired bulk density is reached. This reduction in bulk density allows for the consistent-uninterrupted flow of the microspheres and results in the reduction of striations in the novel polishing pad. In addition, the novel casting apparatus provides tremendous flexibility in increasing manufacturing scale and in pad-type variation. In other words, the novel casting apparatus allows, for example, continuous casting and the use of almost an endless combination of different polymeric materials to manufacture the polishing pad of the present invention.

Figure 1:
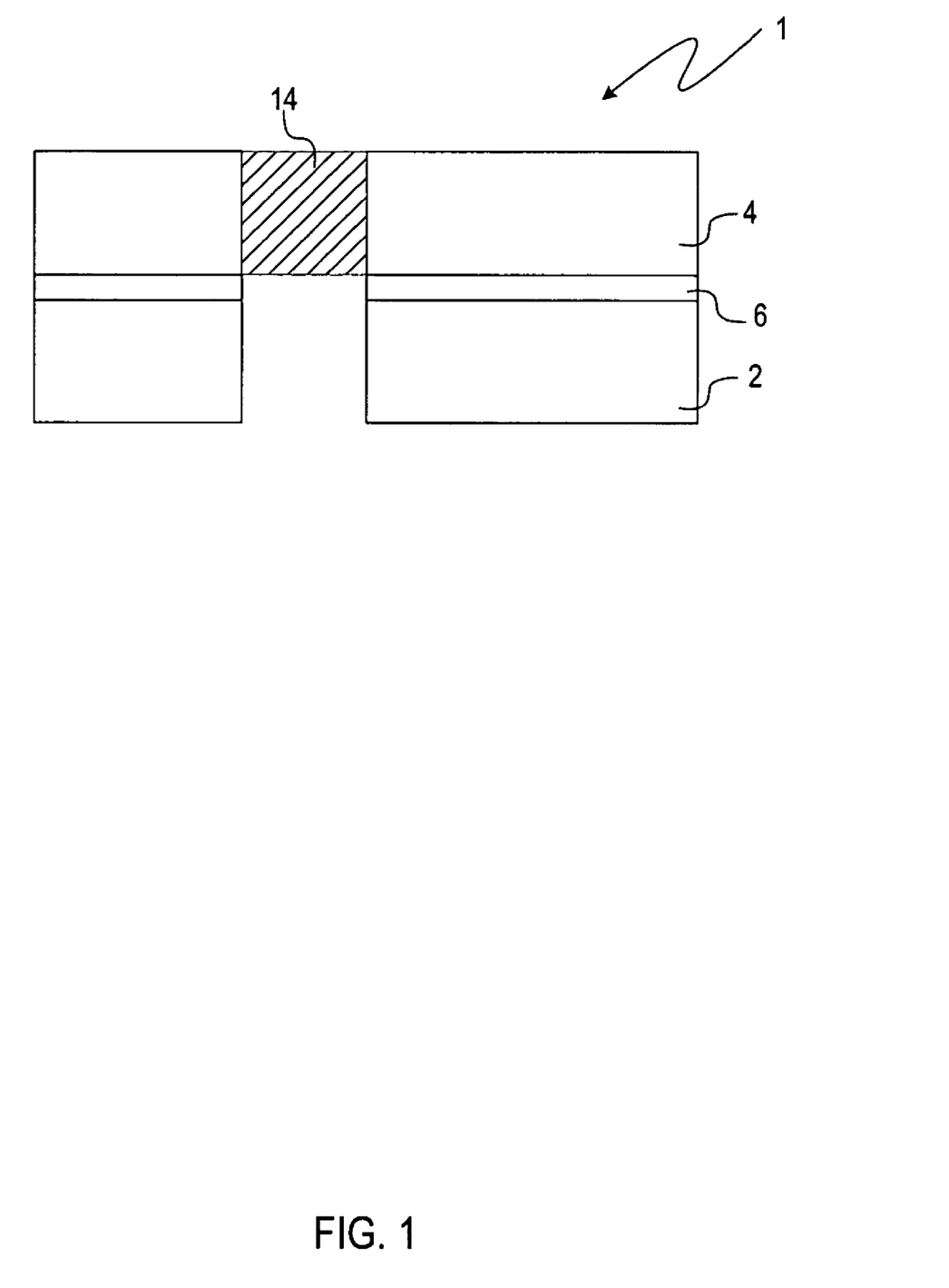
FIG. 1 illustrates a polishing pad of the present invention having reduced striations.

Referring now to FIG. 1, a polishing pad 1 of the present invention is shown. Polishing pad 1 comprises a polishing layer or pad 4, and an optional bottom layer or pad 2. The bottom layer 2 may be made of felted polyurethane, such as SUBA-IV™ pad manufactured by Rohm and Haas Electronic Materials CMP Inc. ("RHEM"), of Newark, Del. The polishing pad 4 may comprise a polyurethane pad (e.g., a pad filled with microspheres), such as, IC 1000™ pad by RHEM. Polishing pad 4 may optionally be texturized as desired. A thin layer of pressure sensitive adhesive 6 may hold the polishing pad 4 and the bottom layer 2 together. The adhesive 6 may be commercially available from 3M Innovative Properties Company of St, Paul, Minn. In addition, polishing pad 4 may have a transparent window 14 provided therein to facilitate end-point detection.

Figure 2:
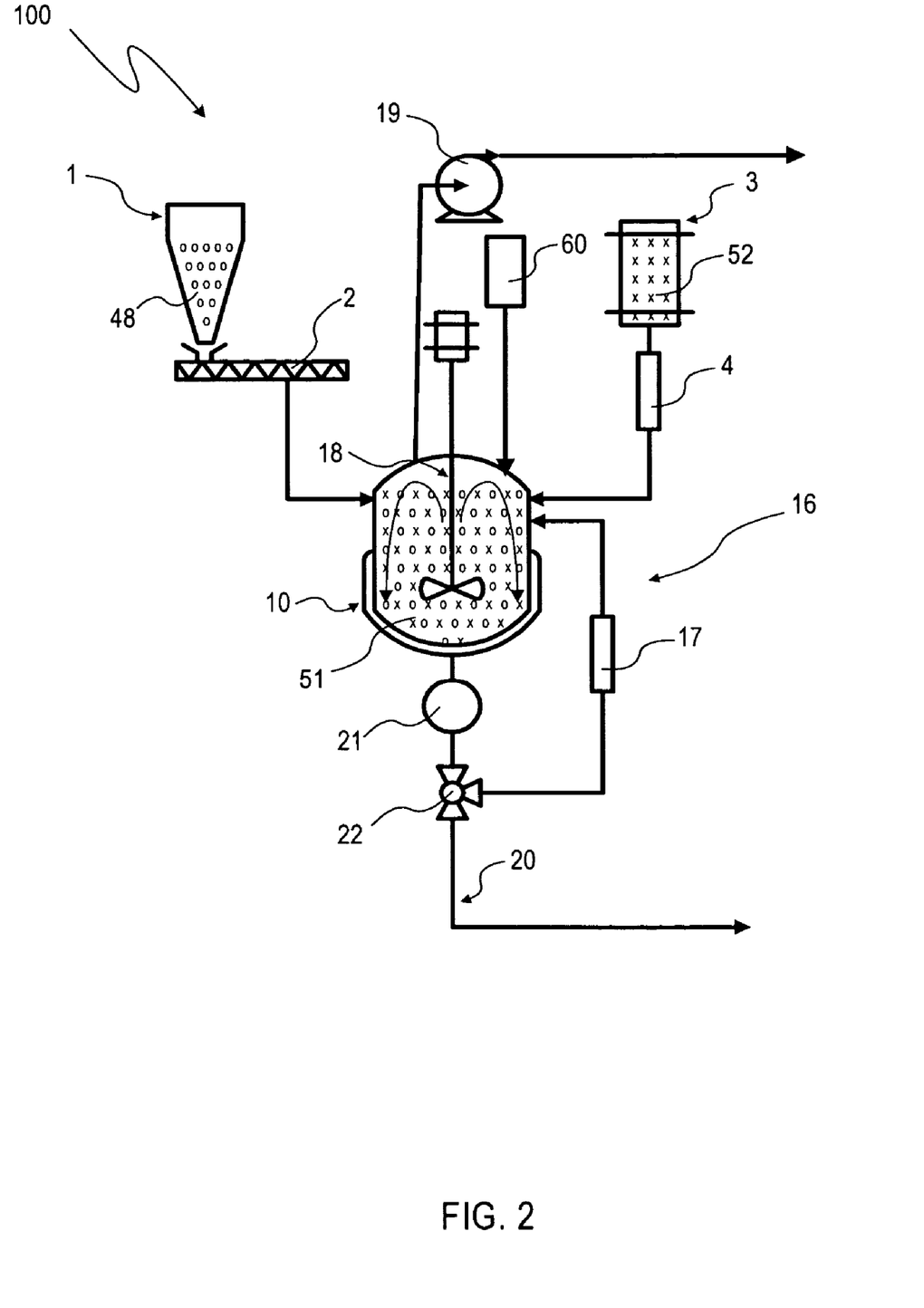
FIG. 2 illustrates an apparatus for forming the polishing pad of the present invention.

Referring now to FIG. 2, a premix apparatus 100 for forming the polishing pad 4 of the present invention is shown. The premix apparatus 100 comprises a filler storage silo 1 sized to hold a sufficient quantity of microspheres or microelements 48. Premix apparatus 100 further comprises a premix prep tank 10 and a prepolymer storage tank 3 sized to hold a sufficient quantity of polymeric materials 52 ("prepolymer"). In addition, premix apparatus 100 advantageously comprises a recirculation loop 16 for controlling the bulk density of the pre-mixture 51 in the premix prep tank 10. Note, although the premix apparatus 100 is described with reference to a "one tank" system, the invention is not so limited. For example any number of storage silos 1, prepolymer storages 3 and premix prep tanks 10 may be utilized in the present invention, as desired.

In operation, a predetermined amount of the polymeric materials 52 is added to the premix prep tank 10. The quantity of the polymeric materials 52 added to the premix prep tank 10 may be controlled by a mass flow metering device 4 with a totalizer (not shown). The quantity of prepolymer 52 added to the premix prep tank 10 may also be controlled by using load cells mounted to the premix prep tank 10.

After the polymeric materials 52 are added to the premix prep tank 10, the agitator 18 agitates the polymeric materials 52 to provide an upward, axial flow of the polymeric materials 52 along the shaft of the agitator 18 resulting in a downward flow of the materials 52 along the inner wall of the premix prep tank 10. Alternatively, the polymeric materials 52 may flow in the opposite direction, as desired. Preferably, the agitator is rotated at a rate of 1 to 500 RPM. More preferably, the agitator is rotated at a rate of 1 to 250 RPM. Most preferably, the agitator is rotated at a rate of 1 to 50 RPM.

Upon activation of the agitator 18, the microspheres 48 in the filler storage silo 1 may be added to the premix prep tank 10. In an exemplary embodiment of the invention, the amount of the microspheres 48 added to the premix prep tank 10 may be performed by a "loss in weight" dry feed metering system 2. The dry feed metering system 2 establishes an initial total weight of the filler storage silo 1, including the microspheres 48 contained within the storage silo 1. Thereafter, a predetermined weight of the microspheres 48 that is to be added to the premix prep tank 10 is set in the dry feed metering system 2. The dry feed metering system 2 may then add the microspheres 48 to the premix prep tank 10 until the change in weight of the filler storage silo 1 matches the desired, predetermined weight of the microspheres 48.

After an appropriate amount of the microspheres 48 is measured out, the microspheres 48 are added to the polymeric materials 52 and blended together to form a pre-mixture 51, assisted by the agitation of the agitator 18. Advantageously, the ratio of the amount of microspheres 48 to that of the polymeric materials 52 is 0 to 50 percent by volume. More advantageously, the ratio of the amount of microspheres 48 to that of the polymeric materials 52 is 0 to 40 percent by volume. Most advantageously, the ratio of the amount of microspheres 48 to that of the polymeric materials 52 is 0.1 to 30 percent by volume.

Advantageously, once the microspheres 48 are blended in the polymeric materials 52, the pre-mixture 51 is re-circulated in recirculation loop 16 to ensure that the pre-mixture 51 remains essentially homogeneous. The recirculation loop 16 helps the pre-mixture 51 to be more uniformly distributed in the premix prep tank 10 and reduces the potential for density stratification. In other words, the recirculation loop 16 allows for an efficient method of controlling or stabilizing the bulk density of the pre-mixture 51.

Advantageously, the recirculation pump 21 draws the pre-mixture 51 from the premix prep tank 10 and directs the pre-mixture 51 through a directional valve 22, the valve 22 returning the pre-mixture 51 back to the premix prep tank 10. The recirculation pump 21 can be a diaphragm, peristaltic, sine, lobe or gear type pump requiring no contact lubrication. The bulk density of the pre-mixture 51 can be monitored by manually, periodically sampling the pre-mixture 51 (weight per volume) in conjunction with a scale (not shown).

Optionally, an in-line densitometer 17 may be provided in the re-circulation loop 16 to monitor the homogeneity (i.e., density) of the pre-mixture 51. Advantageously, the in-line densitometer 17 provides an automated method for measuring and displaying the continuous bulk density of the pre-mixture 51. The in-line densitometer 17 may measure and display density measurements. The in-line densitometer 17 may be commercially obtained from, for example, Anton Paar of Graz, Austria. The in-line densitometer 17 measures the bulk density (ratio of microspheres 48 to polymeric materials 52) of the pre-mixture 51. If the bulk density is outside a pre-determined, acceptable range, the in-line densitometer 17 can be used to monitor the addition of either microspheres 48 or polymeric materials 52 to adjust the bulk density of the pre-mixture 51 into the desired range.

In operation, the in-line densitometer 17 measures the incoming bulk density of the pre-mixture 51 from the directional valve 22. If the measured bulk density is within acceptable, predetermined tolerances, then the pre-mixture 51 is directed by the directional valve 22 to the transfer line 20 for further processing. If the measured bulk density is too high or low, then the pre-mixture 51 is directed by the directional valve 22 to the recirculation loop 16, back to the premix prep tank 10, and is not diverted to the transfer line 20. Rather, the pre-mixture 51 continues to be recirculate. The density measurement of the pre-mixture 51 obtained from the densitometer 17, will be used to provide additional prepolymer 52 or microspheres 48, as desired. Note, the pre-mixture 51 can be returned to the premix prep tank 10 at any level that does not interfere with the discharge of the pre-mixture 51 from the bottom of the premix prep tank 10. Preferably, the pre-mixture 51 is returned in a manner that reduces the amount of entrained gas being introduced into the premixture 51, for example, by returning the pre-mixture 51, subsurface to the storage of the pre-mixture 51 in the tank 10 or by returning the pre-mixture 51 along the inner wall of the tank 10.

Optionally, the premix prep tank 10 may be provided with a vacuum source 19 to remove or degas any entrained gas from the addition of the microspheres 48 to the polymeric materials 52, in order to obtain a more accurate bulk density measurement. Preferably, the premix prep tank 10 is degassed at a pressure of 1 to 10 torr. More preferably, the premix prep tank 10 is degassed at a pressure of 1 to 5 torr. Most preferably, the premix prep tank 10 is degassed at a pressure of less than 2 torr. In addition, the premix apparatus 100 may further comprise an inert gas source 60 to provide a "blanket" inert gas to the pre-mixture 51 when the premix prep tank 10 is not under vacuum from the vacuum source 19.

Preferably, at least a portion of the polymeric microspheres 48 are generally flexible. Suitable polymeric microspheres 48 include inorganic salts, sugars and water-soluble particles. Examples of such polymeric microspheres 48 (or microelements) include polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes, cyclodextrin and combinations thereof (e.g., Expancel™ from Akzo Nobel of Sundsvall, Sweden). The microspheres 48 may be chemically modified to change the solubility, swelling and other properties by branching, blocking, and crosslinking, for example. Preferably, the microspheres 48 has a mean diameter that is less than 150 μm, and more preferably a mean diameter of less than 50 μm. Most Preferably, the microspheres 48 has a mean diameter that is less than 15 μm. Note, the mean diameter of the microspheres may be varied and different sizes or mixtures of different microspheres 48 may be impregnated in the polymeric material 52 as desired. A preferred material for the microsphere is a copolymer of acrylonitrile and vinylidene chloride.

Additionally, in an exemplary embodiment of the present invention, the polymeric material 52 of polishing pad 4 is made from a polyisocyanate-containing material ("prepolymer"). The prepolymer is a reaction product of a polyisocyanate (e.g., diisocyanate) and a hydroxyl-containing material. The polyisocyanate may be aliphatic or aromatic. The prepolymer is then cured with a curing agent. Preferred polyisocyanates include, but are not limited to, methlene bis 4,4' cyclohexylisocyanate, cyclohexyl diisocyanate, isophorone diisocyanate, hexamethylene diisocyanate, propylene-1,2-diisocyanate, tetramethylene-1,4-diisocyanate, 1,6-hexamethylene-diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethylcyclohexane, methyl cyclohexylene diisocyanate, triisocyanate of hexamethylene diisocyanate, triisocyanate of 2,4,4-trimethyl-1,6-hexane diisocyanate, uretdione of hexamethylene diisocyanate, ethylene diisocyanate, 2,2,4-trimethylhexamethylene diisocyanate, 2,4,4-trimethylhexamethylene diisocyanate, dicyclohexylmethane diisocyanate, and mixtures thereof. The preferred polyisocyanate is aliphatic. The preferred aliphatic polyisocyanate has less than 14 percent unreacted isocyanate groups.

Advantageously, the hydroxyl-containing material is a polyol. Exemplary polyols include, but are not limited to, polyether polyols, hydroxy-terminated polybutadiene (including partially/fully hydrogenated derivatives), polyester polyols, polycaprolactone polyols, polycarbonate polyols, and mixtures thereof.

In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG. Suitable polyester polyols include, but are not limited to, polyethylene adipate glycol, polybutylene adipate glycol, polyethylene propylene adipate glycol, o-phthalate-1,6-hexanediol, poly(hexamethylene adipate) glycol, and mixtures thereof. The hydrocarbon chain can have saturated or unsaturated bonds, or substituted or unsubstituted aromatic and cyclic groups. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups. Suitable polycarbonates include, but are not limited to, polyphthalate carbonate and poly(hexamethylene carbonate) glycol.

In a preferred embodiment of the invention, the polymeric material 52 may be formed of, for example, polyurethanes, both thermoset and thermoplastic, polycarbonates, polyesters, silicones, polyimides and polysulfone. Other example materials for polymeric material 52 include, but are not limited to, polyvinyl chloride, polyacrylonitrile, polymethylmethacrylate, polyvinylidene fluoride, polyethylene terephthalate, polyetheretherketone, polyetherketone, polyetherimide, ethylvinyl acetate, polyvinyl butyrate, polyvinyl acetate, acrylonitrile butadiene styrene, fluorinated ethylene propylene and perfluoralkoxy polymers, and combinations thereof. A preferred polymeric material 52 is polyurethane.

Figure 3:
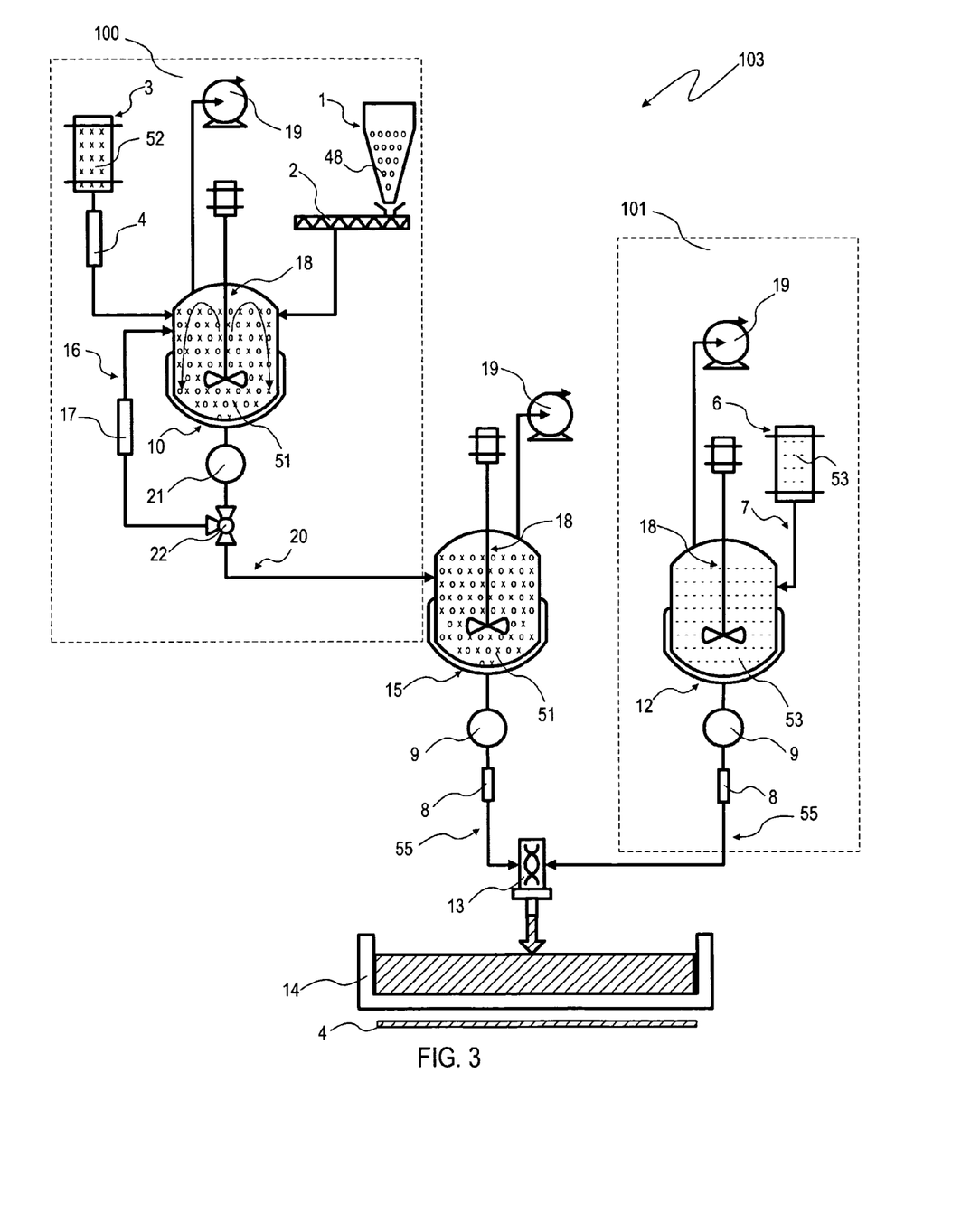
FIG. 3 illustrates another embodiment of an apparatus for forming the polishing pad of the present invention.

Referring now to FIG. 3, a casting apparatus 103, which includes the premix apparatus 100 and a premix run tank 15 as well as a curative apparatus 101, is illustrated. Curative apparatus 101 further comprises a curative run tank 12 and a curative storage tank 6. Note, although this embodiment is illustrated with a single premix run tank 15 and a single curative apparatus 101, any number of premix run tanks and curative tanks may be utilized, as desired. In operation, once a homogeneous blend with an acceptable bulk density is prepared in the premix apparatus 100, the pre-mixture 51 may then be transferred to the premix run tank 15 via the transfer line 20. The transfer line 20 can comprise any non-rusting metal, plastic or polymeric material. This transfer is accomplished by drawing the pre-mixture 51 from the bottom of the premix prep tank 10 using the transfer pump 21, passing the pre-mixture 51 through the directional valve 22, which diverts the flow to the transfer line 20, and sending the pre-mixture into the premix run tank 15. Advantageously, once the pre-mixture 51 is transferred from the premix prep tank 10 to the premix run tank 15, the premix prep tank 10 is available for the preparation of a new batch of the pre-mixture 51. In addition, the pre-mixture 51 contained in the premix run tank 15 is now available for casting. As shown, by having a separate premix preparation process of the present invention, an uninterrupted casting process is possible.

During casting, the pre-mixture 51 from the premix run tank 15 and the curing agent 53 from the curative run tank 12 are metered to a mixer 13 where the individual components 51, 53 are blended and cast directly into a cast mold 14. The molded article is then cured and cut to form the polishing pad 4 of the present invention. The premix run tank 15 and the curative run tank 12 are also provided with an agitator 18, similar to the agitator 18 of the premix prep tank 10. Additional curing agent 53 is provided from a curative storage tank 6 by a level controller 7.

Advantageously, the bulk density of the polishing pad 4 is directly controlled by the ratio of the mixture of the two individual components 51, 53. The ratio of the mixture of the components 51, 53 from the premix run tank 15 and the curative run tank 12 is controlled by individual metering pumps 9 in-conjunction with flow meters 8 contained within the delivery line 55.

Advantageously, the curing agent is a polydiamine. Preferred polydiamines include, but are not limited to, diethyl toluene diamine ("DETDA"), 3,5-dimethylthio-2,4-toluenediamine and isomers thereof, 3,5-diethyltoluene-2,4-diamine and isomers thereof, such as 3,5-diethyltoluene-2,6-diamine, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline) ("MCDEA"), polytetramethyleneoxide-di-p-aminobenzoate, N,N'-dialkyldiamino diphenyl methane, p,p'-methylene dianiline ("MDA"), m-phenylenediamine ("MPDA"), methylene-bis 2-chloroaniline ("MBOCA"), 4,4'-methylene-bis-(2-chloroaniline) ("MOCA"), 4,4'-methylene-bis-(2,6-diethylaniline) ("MDEA"), 4,4'-methylene-bis-(2,3-dichloroaniline) ("MDCA"), 4,4'-diamino-3,3'-diethyl-5,5'-dimethyl diphenylmethane, 2,2',3,3'-tetrachloro diamino diphenylmethane, trimethylene glycol di-p-aminobenzoate, and mixtures thereof. Preferably, the curing agent of the present invention includes 3,5-dimethylthio-2,4-toluenediamine and isomers thereof. Suitable polyamine curatives include both primary and secondary amines.

In addition, other curatives such as, a diol, triol, tetraol, or hydroxy-terminated curative may be added to the aforementioned polyurethane composition. Suitable diol, triol, and tetraol groups include ethylene glycol, diethylene glycol, polyethylene glycol, propylene glycol, polypropylene glycol, lower molecular weight polytetramethylene ether glycol, 1,3-bis(2-hydroxyethoxy) benzene, 1,3-bis-[2-(2-hydroxyethoxy) ethoxy]benzene, 1,3-bis-{2-[2-(2-hydroxyethoxy) ethoxy]ethoxy}benzene, 1,4-butanediol, 1,5-pentanediol, 1,6-hexanediol, resorcinol-di-(beta-hydroxyethyl) ether, hydroquinone-di-(beta-hydroxyethyl) ether, and mixtures thereof. Preferred hydroxy-terminated curatives include 1,3-bis(2-hydroxyethoxy) benzene, 1,3-bis-[2-(2-hydroxyethoxy) ethoxy]benzene, 1,3-bis-{2-[2-(2-hydroxyethoxy) ethoxy]ethoxy}benzene, 1,4-butanediol, and mixtures thereof. Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Accordingly, the present invention provides an apparatus for forming a chemical mechanical polishing pad, comprising a tank with polymeric materials, a storage silo with microspheres and a curative storage tank with curing agents. The apparatus further provides a premix prep tank for forming a pre-mixture of the polymeric materials and the microspheres and a recirculation loop in the premix prep tank for recirculating the pre-mixture until a desired bulk density is reached. The apparatus further provides a premix run tank for storing the pre-mixture, a mixer for forming a mixture of the pre-mixture and the curing agents and a mold for molding the mixture.

Figure 4:
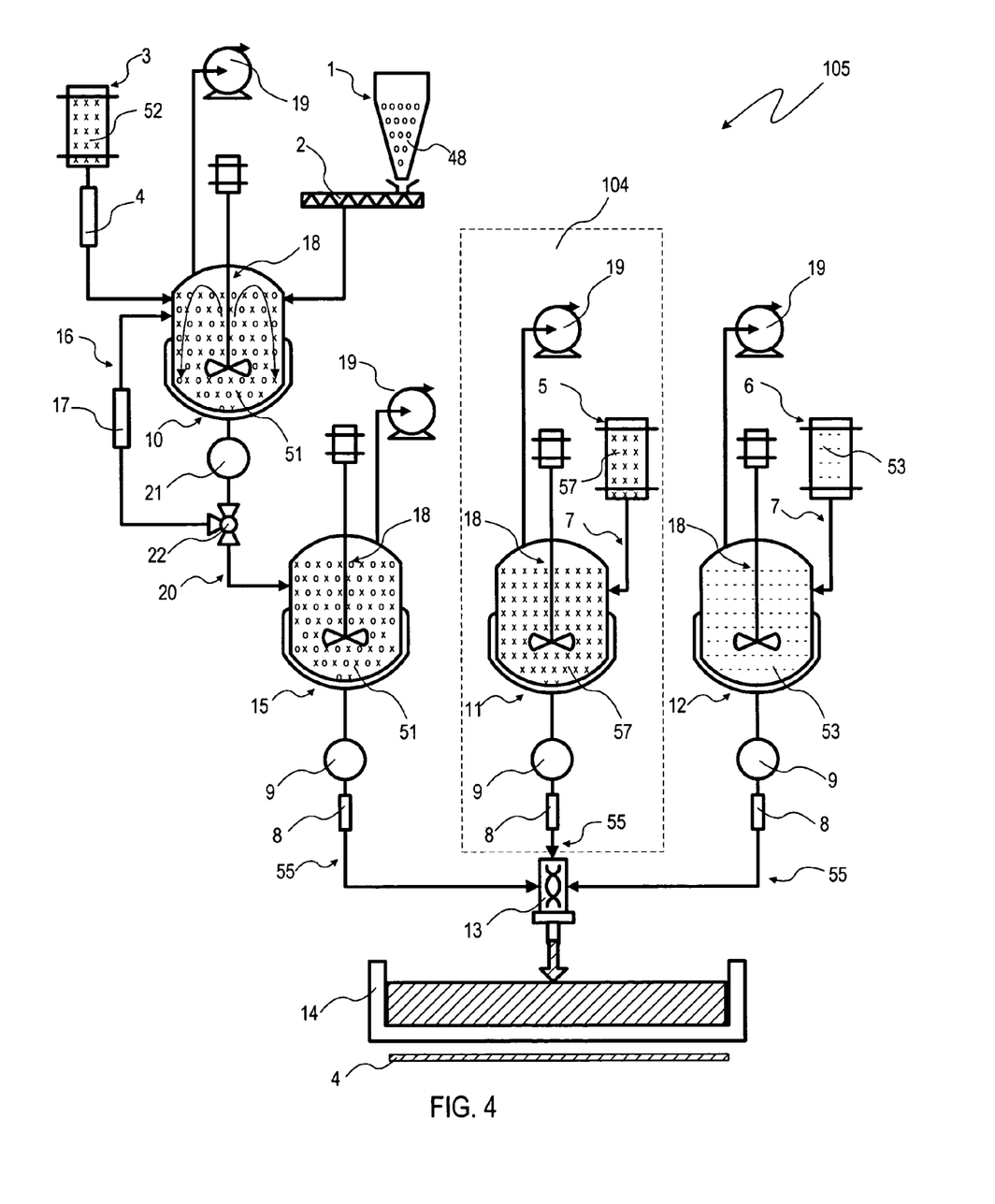
FIG. 4 illustrates another embodiment of an apparatus for forming the polishing pad of the present invention.

Referring now to FIG. 4, a casting apparatus 105, which includes a prepolymer apparatus 104 is illustrated. Prepolymer apparatus 104 further comprises a prepolymer run tank 11 and a secondary prepolymer storage tank 5. In this embodiment, the prepolymer run tank 11 allows for the additional, flexible control of the bulk density of the molded article in the casting mold 14. For example, the final bulk density ratio of the microspheres 48 to prepolymer 57 can be adjusted by the addition of a non-filled prepolymer 57 from the prepolymer run tank 11 to the mixer 13 along with the component addition from the premix run tank 15 and the curative run tank 12. The addition of the non-filled prepolymer 57 to the mixer 13 is regulated by the flow control meter 8 and the metering pump 9. The prepolymer run tank 11 is also provided with an agitator 18, similar to the agitator 18 of the premix prep tank 10. Additional polymeric materials 57 to the prepolymer run tank 11 is provided from a secondary prepolymer storage tank 5 by the level controller 7. Note, although a single prepolymer run tank 11 is shown, the invention may be practiced with any number of additional prepolymer run tanks, as desired. In addition, the prepolymer 57 may be the same as the prepolymer 52 or any other polymeric material, as desired.

During casting, the pre-mixture 51 from the premix run tank 15, the curing agent 53 from the curative run tank 12 and prepolymer 57 from the prepolymer run tank 11 are metered to a mixer 13 where the individual components 51, 53 and 57 are blended and cast directly into a cast mold 14. The molded article is then cured and cut to form a polishing pad 4 of the present invention. Advantageously, the bulk density of the polishing pad 4 is directly controlled by the ratio of the mixture of the three individual components 51, 53 and 57. The ratio of the mixture of the components 51, 53 and 57 from the premix run tank 15, the curative run tank 12 and the prepolymer run tank 11 is controlled by individual metering pumps 9 in-conjunction with flow meters 8 contained within the delivery lines 55.

Optionally, the prepolymer run tank 11 may be provided with a vacuum 19 to remove or degas any mechanically entrained gas. Additionally, the premix run tank 15 and the curative run tank 12 may also be provided with a vacuum 19. Preferably, the premix prep tank 10 is degassed at a pressure of 1 to 10 Torr. More preferably, the premix prep tank 10 is degassed at a pressure of 1 to 5 Torr. Most preferably, the premix prep tank 10 is degassed at a pressure of less than 2 Torr.

Accordingly, the present invention provides an apparatus for forming a chemical mechanical polishing pad, comprising a first prepolymer storage tank with first polymeric materials, a storage silo with microspheres and a curative storage tank with curing agents. The apparatus further comprises a premix prep tank for forming a pre-mixture of the first polymeric materials and the microspheres and a recirculation loop in the premix prep tank for recirculating the pre-mixture until a desired bulk density is reached. The apparatus further provides a premix run tank for storing the pre-mixture, a mixer for forming a mixture of the pre-mixture and the curing agents and at least a second prepolymer storage tank with second polymeric materials for providing the second polymeric materials to the mixture until a desired bulk density is reached. Finally, the apparatus further comprises a mold for molding the mixture.

Figure 5:
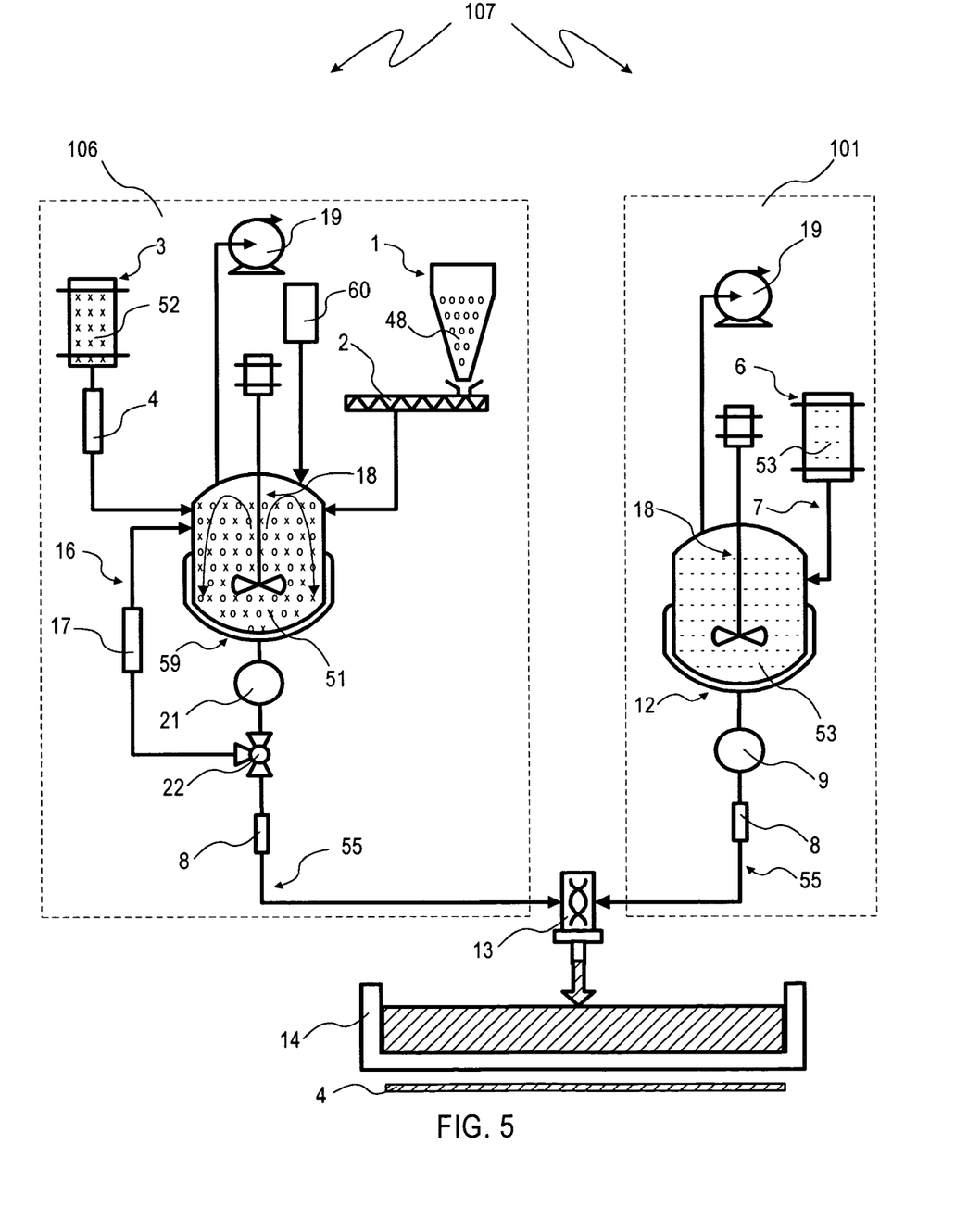
FIG. 5 illustrates another embodiment of an apparatus for forming the polishing pad of the present invention.

Referring now to FIG. 5, a casting apparatus 107 comprising a premix run/prep apparatus 106 and a curative apparatus 101, is illustrated. Premix run/prep apparatus 106 further comprises a filler storage silo 1 sized to hold a sufficient quantity of microspheres or microelements 48. Premix run/prep apparatus 106 further comprises a premix run/prep tank 59 and a prepolymer storage tank 3 sized to hold a sufficient quantity of polymeric material 52. In addition, premix run/prep apparatus 106 advantageously comprises a recirculation loop 16 for controlling the bulk density of the premixture 51 in the premix run/prep tank 59. Note, in contrast to the embodiments of FIGS. 2, 3 and 4, the embodiment of FIG. 5 (and FIG. 6, below) provides a premix prep tank and a premix run tank in a single run/prep tank. In other words, the embodiment of FIG. 5 (and FIG. 6) eliminates the need for a "transfer step" between the premix prep tank and the premix run tank. Note, however, that while this embodiment allows for batch casting of the polishing pad of the present invention, it does not allow for continuous casting.

In operation, a predetermined amount of the polymeric materials 52 is added to the premix run/prep tank 59. The quantity of the polymeric materials 52 added to the premix run/prep tank 59 may be controlled by a mass flow metering device 4. The quantity of prepolymer 52 added to the premix run/prep tank 59 may also be controlled by using load cells mounted to the premix run/prep tank 59.

After the polymeric materials 52 are added to the premix run/prep tank 59, the agitator 18 agitates the polymeric materials 52 to provide an upward, axial flow of the polymeric materials 52 along the shaft of the agitator 18 resulting in a downward flow of the polymeric materials 52 along the inner wall of the premix run/prep tank 59. Preferably, the agitator is rotated at a rate of 1 to 500 RPM. More preferably, the agitator is rotated at a rate of 1 to 250 RPM. Most preferably, the agitator is rotated at a rate of 1 to 50 RPM.

Upon activation of the agitator 18, the microspheres 48 in the file storage silo 1 may be added to the premix run/prep tank 59. In an exemplary embodiment of the invention, the amount of the microspheres 48 added to the premix run/prep tank 59 may be performed by a "loss in weight" dry feed metering system 2. The dry feed metering system 2 establishes an initial total weight of the filler storage silo 1, including the microspheres 48 contained within the storage silo 1. Thereafter, a predetermined weight of the microspheres 48 that is to be added to the premix prep tank 10 is set in the dry feed metering system 2. The dry feed metering system 2 may then add the microspheres 48 to the premix prep tank 10 until the change in weight of the filler storage silo 1 matches the desired, predetermined weight of the microspheres 48.

After an appropriate amount of the microspheres 48 is measured out, the microspheres 48 are added to the polymeric materials 52 and blended together to form a pre-mixture 51, assisted by the agitation of the agitator 18. Advantageously, the ratio of the amount of microspheres 48 to that of the polymeric materials 52 is 0 to 50 percent by volume. More advantageously, the ratio of the amount of microspheres 48 to that of the polymeric materials 52 is 0 to 40 percent by volume. Most advantageously, the ratio of the amount of microspheres 48 to that of the polymeric materials 52 is between 0.1 to 30 percent by volume.

Advantageously, once the microspheres 48 are blended in the polymeric materials 52, the pre-mixture 51 is re-circulated in recirculation loop 16 to ensure that the pre-mixture 51 remains essentially homogeneous. The recirculation loop 16 helps the pre-mixture 51 to be more uniformly distributed in the premix run/prep tank 59 and reduces the potential for density stratification. In other words, the recirculation loop 16 allows for an efficient method of controlling the bulk density of the pre-mixture 51. The bulk density of the pre-mixture 51 can be monitored by manually, periodically sampling the pre-mixture 51 in conjunction with a scale (not shown).

Advantageously, the recirculation pump 21 draws the pre-mixture 51 from the premix run/prep tank 59 and directs the pre-mixture 51 through a directional valve 22, the valve 22 returning the pre-mixture 51 back to the premix run/prep tank 59. The recirculation pump 21 can be a diaphragm, peristaltic, sine, or lobe type pump requiring no contact lubrication. Optionally, an in-line densitometer 17 may be provided in the re-circulation loop 16 to monitor the homogeneity of the pre-mixture 51. Advantageously, the in-line densitometer 17 provides an automated method for measuring the continuous bulk density of the pre-mixture 51. The in-line densitometer 17 may measure and display density measurements. The in-line densitometer 17 measures the bulk density (ratio of microspheres 48 to polymeric materials 52) of the pre-mixture 51. If the bulk density is outside a pre-determined, acceptable range, the in-line densitometer 17 can be used to monitor the addition of either microspheres 48 or polymeric materials 52 to adjust the bulk density of the pre-mixture 51 into the desired range.

In operation, the in-line densitometer 17 measures the incoming bulk density of the pre-mixture 51 from the directional valve 22. If the calculated bulk density is within acceptable, predetermined tolerances, then the measured pre-mixture 51 is directed by the directional valve 22 to the delivery line 55. If the calculated bulk density is too high or low, then the measured pre-mixture 51 is directed by the directional valve 22 to the recirculation loop 16, back to the premix run/prep tank 59, to be agitated again. In other words, if the bulk density is too high, then additional agitation is conducted. Note, the pre-mixture 51 can be returned to the premix run/prep tank 59 at any level that does not interfere with the discharge of the pre-mixture 51 from the bottom of the premix run/prep tank 59.

Optionally, the premix run/prep tank 59 may be provided with a vacuum 19 to remove or degas any entrained gas from the addition of the microspheres 48 to the polymeric materials 52, in order to obtain a more accurate bulk density measurement. Preferably, the premix run/prep tank 59 is degassed at a pressure of 1 to 10 Torr. More preferably, the premix prep tank 10 is degassed at a pressure of 1 to 5 Torr. Most preferably, the premix prep tank 10 is degassed at a pressure of less than 2 Torr.

Referring still to FIG. 5, the curative apparatus 101 further comprises a curative run tank 12 and a curative storage tank 6. Note, although this embodiment is illustrated with a single curative apparatus 101, any number of curative apparatuses may be utilized, as desired. During casting, the pre-mixture 51 from the premix run/prep tank 59 and the curing agent 53 from the curative run tank 12 are metered to a mixer 13 where the individual components 51, 53 are blended and cast directly into a cast mold 14. The molded article is then cured and cut to form the polishing pad 4 of the present invention. The premix run/prep tank 59 and the curative run tank 12 are also provided with an agitator 18, similar to the agitator 18 of the premix prep tank 10. Additional curing agent 53 is provided from a curative storage tank 6 by a level controller 7. Advantageously, the bulk density of the polishing pad 4 is directly controlled by the ratio of the mixture of the two individual components 51, 53. The ratio of the mixture of the components 51, 53 from the premix run/prep tank 59 and the curative run tank 12 is controlled by recirculation pump 21 and metering pump in-conjunction with flow meters 8 contained within the delivery line 55.

Figure 6:
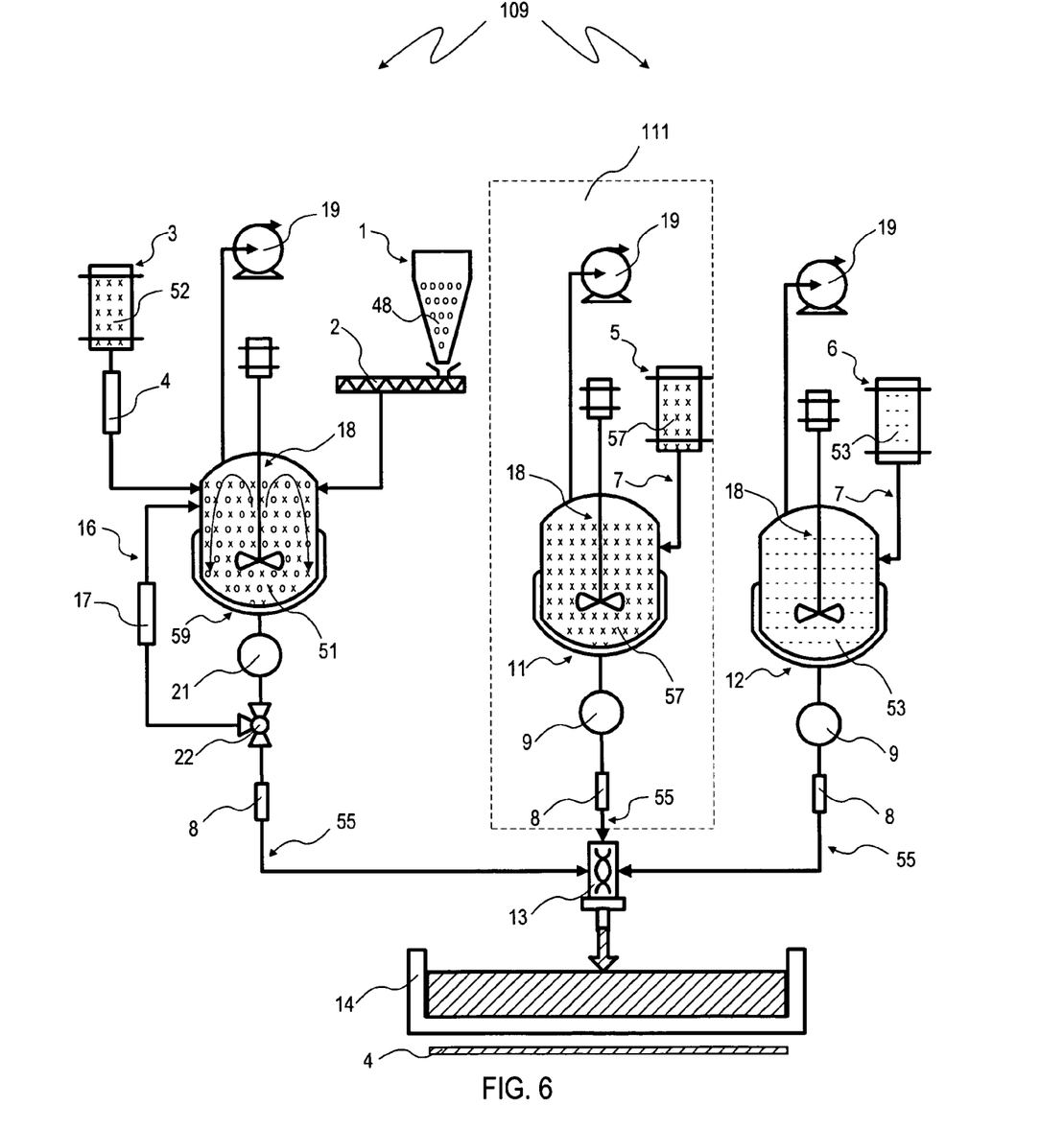
FIG. 6 illustrates another embodiment of an apparatus for forming the polishing pad of the present invention.

Referring now to FIG. 6, a casting apparatus 109 comprising a secondary prepolymer apparatus 111, is illustrated. Prepolymer apparatus 111 further comprises a secondary prepolymer run tank 11 and a secondary prepolymer storage tank 5. In this embodiment, the prepolymer run tank 11 allows for the additional, flexible control of the molded article in the casting mold 14. For example, the final bulk density ratio of the microspheres 48 to prepolymer 52 can be adjusted by the addition of a non-filled prepolymer 57 from the prepolymer run tank 11 to the mixer 13 along with the component addition from the premix run/prep tank 59 and the curative run tank 12. The addition of the non-filled prepolymer 57 to the mixer 13 is regulated by the flow control meter 8 and the metering pump 9. The prepolymer run tank 11 is also provided with an agitator 18, similar to the agitator 18 of the premix prep tank 10. Additional polymeric materials 57 to the prepolymer run tank 11 is provided from the secondary prepolymer storage tank 5 by the level controller 7. Note, although a single prepolymer run tank 11 is shown, the invention may be practiced with any number of additional prepolymer run tanks, as desired. In addition, the prepolymer 57 may be the same as the prepolymer 52 or any other polymeric material, as desired.

During casting, the pre-mixture 51 from the premix run/prep tank 59, the curing agent 53 from the curative run tank 12 and non-filled prepolymer 57 from the prepolymer run tank 11 are metered to a mixer 13 where the individual components 51, 53 and 57 are blended and cast directly into a cast mold 14. The molded article is then cured and cut to form polishing pad 4 of the present invention. Advantageously, the bulk density of the polishing pad 4 is directly controlled by the ratio of the mixture of the three individual components 51, 53 and 57. The ratio of the mixture of the components 51, 53 and 57 from the premix run/prep tank 59, the curative run tank 12 and the prepolymer run tank 11 is controlled by individual metering pumps 9 in-conjunction with flow meters 8 contained within the delivery line 55.

Accordingly, the present invention provides an apparatus for forming a chemical mechanical polishing pad, comprising a prepolymer storage tank with polymeric materials, a storage silo with microspheres and a curative storage tank with curing agents. The apparatus further comprises a premix run/prep tank for forming a pre-mixture of the polymeric materials and the microspheres and a recirculation loop in the premix run/prep tank for recirculating the pre-mixture until a desired bulk density is reached. The apparatus further comprises a mixer for forming a mixture of the pre-mixture and the curing agents and a mold for molding the mixture.

Figure 7:
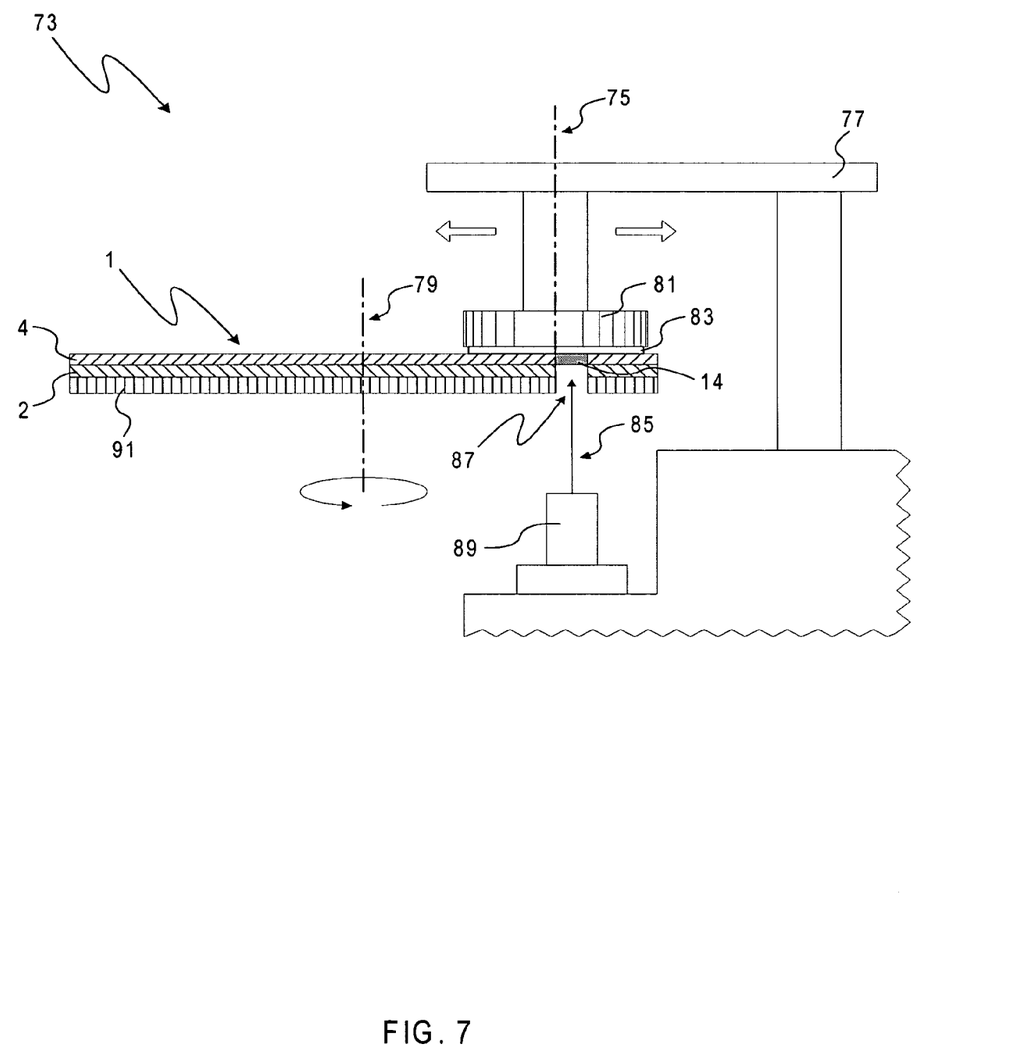
FIG. 7 illustrates a CMP system utilizing the polishing pad of the present invention.

Referring now to FIG. 7, a CMP apparatus 73 utilizing the striation reduced polishing pad of the present invention is provided. Apparatus 73 includes a wafer carrier 81 for holding or pressing the semiconductor wafer 83 against the polishing platen 91. The polishing platen 91 is provided with a stacked polishing pad 1, including the striation reduced polishing pad 4 of the present invention. As discussed above, pad 1 has a bottom layer 2 that interfaces with the surface of the platen 91, and a polishing pad 4 that is used in conjunction with a chemical polishing slurry to polish the wafer 83. Note, although not pictured, any means for providing a polishing fluid or slurry can be utilized with the present apparatus. The platen 91 is usually rotated about its central axis 79. In addition, the wafer carrier 81 is usually rotated about its central axis 75, and translated across the surface of the platen 91 via a translation arm 77. Note, although a single wafer carrier is shown in FIG. 7, CMP apparatuses may have more than one spaced circumferentially around the polishing platen. In addition, a transparent hole 87 is provided in the platen 91 and overlies the window 14 of pad 1. Accordingly, transparent hole 87 provides access to the surface of the wafer 83, via window 14, during polishing of the wafer 83 for accurate end-point detection. Namely, a laser spectrophotometer 89 is provided below the platen 91 that projects a laser beam 85 to pass and return through the transparent hole 87 and window 14 for accurate end-point detection during polishing of the wafer 83.

Accordingly, the present invention provides a method of forming a chemical mechanical polishing pad comprising the steps of, providing a tank with polymeric materials, a storage silo with microspheres and a curative storage tank with curing agents. Further, the method includes delivering the polymeric materials and the microspheres to a premix prep tank and forming a pre-mixture of the polymeric materials and the microspheres. The method further includes the step of providing a recirculation loop in the premix prep tank for recirculating the pre-mixture until a desired bulk density is reached. The method further provides the steps of delivering the pre-mixture to a premix run tank, forming a mixture of the pre-mixture and the curing agents, pouring the mixture into a mold and cutting the mold into the polishing pad.

What is claimed is:

1. An apparatus for forming a chemical mechanical polishing pad, comprising:
   a tank with polymeric materials;
   a storage silo with microspheres;
   a curative storage tank with curing agents;
   a premix prep tank for forming a pre-mixture of the polymeric materials and the microspheres;
   a recirculation loop in the premix prep tank for recirculating the pre-mixture until a desired bulk density is reached;
   a premix run tank for storing the pre-mixture;
   a mixer for forming a mixture of the pre-mixture and the curing agents; and
   a mold for molding the mixture.

2. The apparatus of claim 1 further comprising an agitator for agitating the pre-mixture in the premix prep tank.

3. The apparatus of claim 1 further comprising a vacuum for degassing the premix prep tank.

4. The apparatus of claim 1 further comprising an in-line densitometer in the recirculation loop for measuring the bulk density of the pre-mixture.

5. The apparatus of claim 1 wherein the microsphere comprises polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes, cyclodextrin, copolymers of acrylonitrile and vinylidene chloride and combinations thereof.

6. The apparatus of claim 1 wherein the polymeric material comprises, polyurethanes, polycarbonates, polyesters, silicones, polyimides, polysulfone, polyvinyl chloride, polyacrylonitrile, polymethylmethacrylate, polyvinylidene fluoride, polyethylene terephthalate, polyetheretherketone, polyetherketone, polyetherimide, ethylvinyl acetate, polyvinyl butyrate, polyvinyl acetate, acrylonitrile butadiene styrene, fluorinated ethylene propylene and perfluoralkoxy polymers, and combinations thereof.

7. An apparatus for forming a chemical mechanical polishing pad, comprising:
   a first prepolymer storage tank with first polymeric materials;
   a storage silo with microspheres;
   a curative storage tank with curing agents;
   a premix prep tank for forming a pre-mixture of the first polymeric materials and the microspheres;
   a recirculation loop in the premix prep tank for recirculating the pre-mixture until a desired bulk density is reached;
   a premix run tank for storing the pre-mixture;
   a mixer for forming a mixture of the pre-mixture and the curing agents;
   at least a second prepolymer storage tank with second polymeric materials for providing the second polymeric materials to the mixture until a desired bulk density is reached; and
   a mold for molding the mixture.

8. The apparatus of claim 7 wherein the first and second polymeric materials are the same.

9. An apparatus for forming a chemical mechanical polishing pad, comprising:
   a prepolymer storage tank with polymeric materials;
   a storage silo with microspheres;
   a curative storage tank with curing agents;
   a premix run/prep tank for forming a pre-mixture of the polymeric materials and the microspheres;
   a recirculation loop in the premix run/prep tank for recirculating the pre-mixture until a desired bulk density is reached;
   a mixer for forming a mixture of the pre-mixture and the curing agents; and
   a mold for molding the mixture.

10. The apparatus of claim 9 further comprising another prepolymer storage tank for providing additional polymeric materials to the mixture.

* * * * *